Feb. 27, 1945. F. R. WALLACE ET AL 2,370,383
VARIABLE STROKE FUEL INJECTOR
Filed Feb. 2, 1943 5 Sheets-Sheet 1

WITNESS:
Robt R Mitchel

INVENTORS
Frank R. Wallace
Harry O. Hedges
BY
Augustus B Stoughton
ATTORNEY.

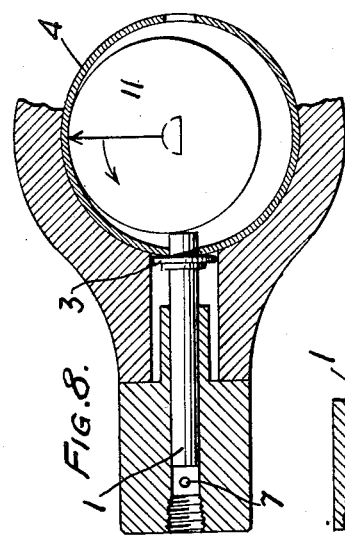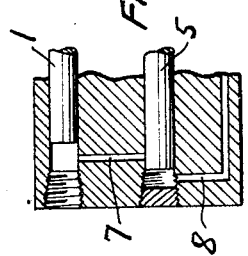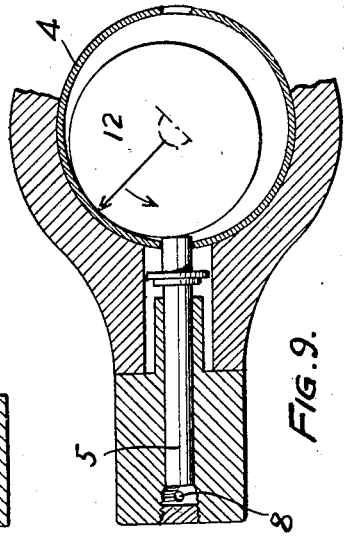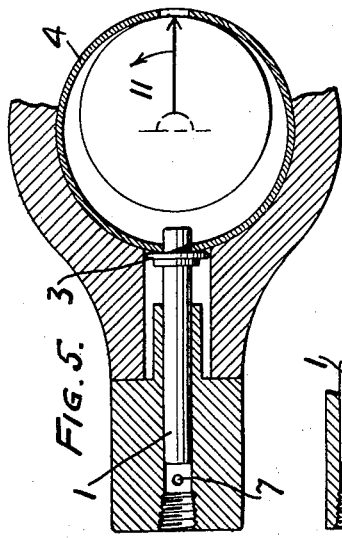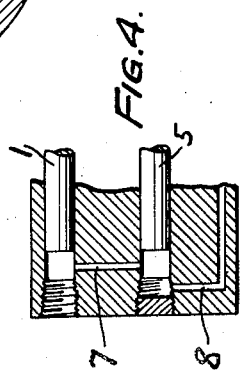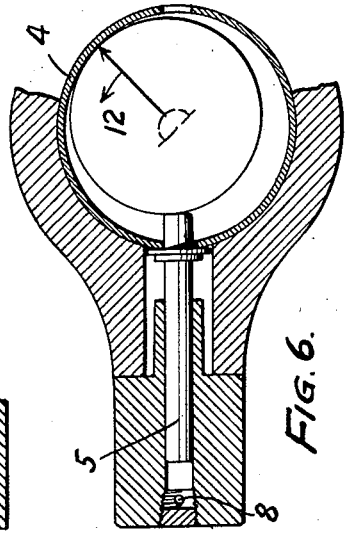

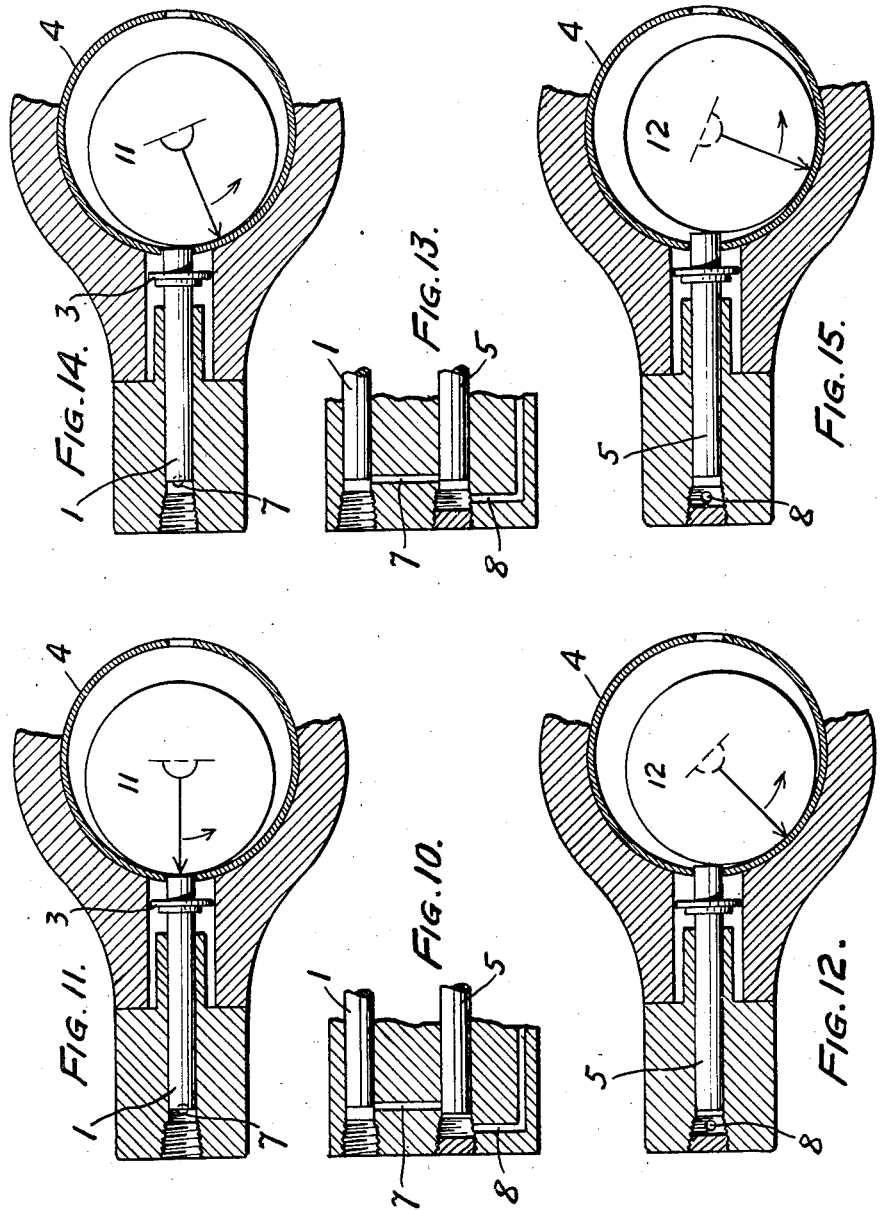

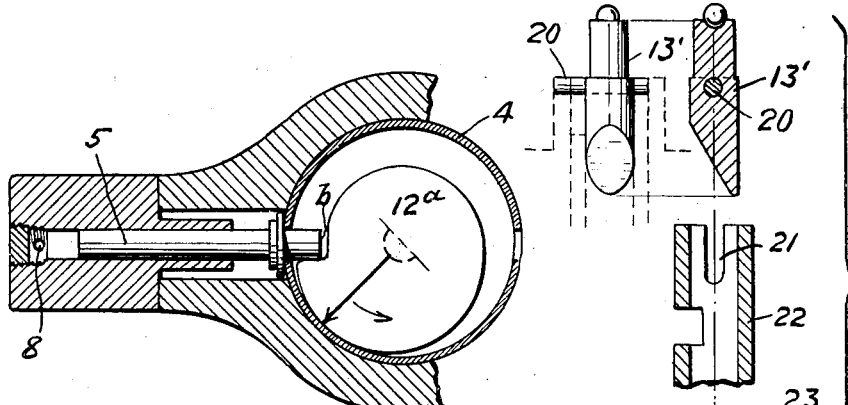
FIG. 16.
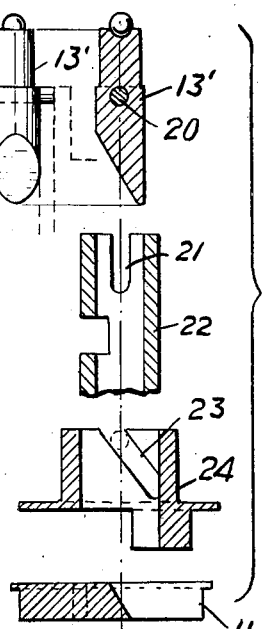
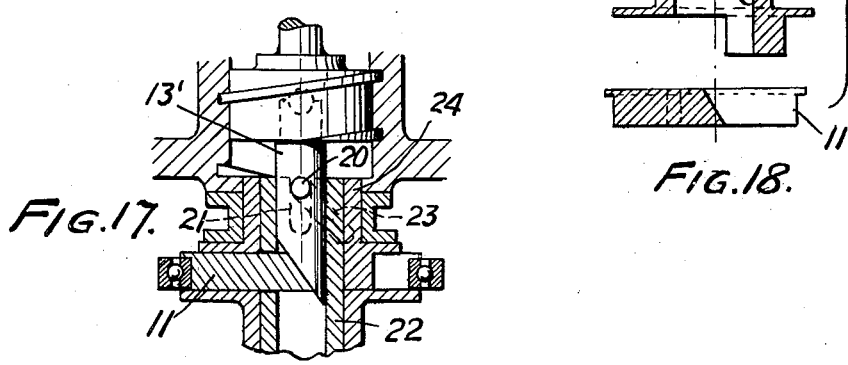
FIG. 17.   FIG. 18.
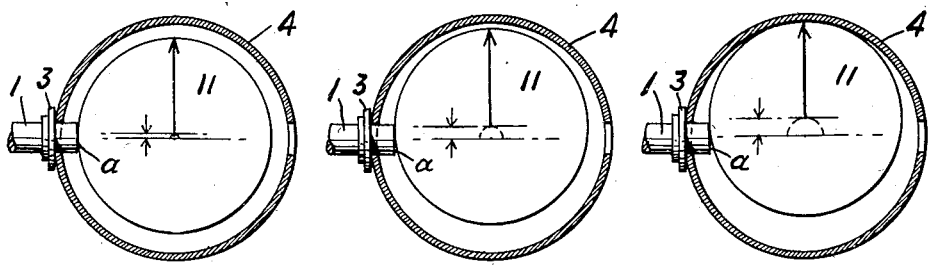
FIG. 19.   FIG. 20.   FIG. 21.

Patented Feb. 27, 1945

2,370,383

UNITED STATES PATENT OFFICE 2,370,383

VARIABLE STROKE FUEL INJECTOR

Frank R. Wallace, Bordentown, N. J., and Harry O. Hedges, Philadelphia, Pa., assignors to Tabor-Hedges Company, Philadelphia, Pa., a corporation of Pennsylvania Application February 2, 1943, Serial No. 474,454

1 Claim. (Cl. 103—38)

Objects of the present invention are: to provide a variable stroke fuel injector mechanism for Diesel engines and the like in which the period of injection is substantially the same no matter what the length of stroke or the volume of fuel injected may be, and which shall be comparatively silent in operation and which offers very little frictional resistance; and to insure that the cut-off valve shall unseal a gravity fuel intake before the initiation of the suction stroke of the injection plunger, whereby the plunger cylinder is kept substantially full of fluid fuel and vaporization and condensation of the fuel oil in the plunger cylinder is avoided, although the length of the plunger stroke may be varied.

Other objects of the invention will appear from the following description at the end of which the invention will be claimed.

Generally stated, the invention comprises a cut-off valve plunger and an injection plunger spring-pressed in one direction, and annular ball-bearings eccentrically mounted and having their outer races disposed to contact respectively with said plungers and operate them in such a way that the cut-off valve opens the fuel inlet to the injector plunger before the latter initiates its suction stroke, and means for adjusting the length but not the period of the stroke of the fuel injector plunger without disturbing the described operation of the cut-off valve.

The invention also comprises the improvements to be presently described and finally claimed.

In the following description, reference will be made to the accompanying drawings forming part hereof and in which, Fig. 1 is a vertical sectional view illustrating a varible stroke fuel injector embodying features of the invention;

Figs. 4, 5 and 6 are, respectively, a vertical section, a diagrammatic section through the injection plunger, and a diagrammatic section through the cut-off plunger when the cut-off plunger is at the end of its suction stroke;

Figs. 7, 8 and 9 are similar views showing the positions of the parts when the eccentrics have been advanced 90° and indicating that the cut-off plunger has closed the inlet to the cylinder of the ejection plunger which may be regarded as moving toward the left;

Figs. 10, 11 and 12 are similar views showing the position of the parts when the eccentrics have moved through an additional 90°, the ejection plunger being substantially at rest while the cut-off plunger is moving toward the right to uncover the fuel inlet in advance of the movement of the ejection plunger toward the right;

Figs. 13, 14 and 15 are similar views showing the position of the parts when the eccentrics have moved through additional degrees. The ejection plunger is still at rest and the cut-off plunger has moved further toward the right, fully opening the inlet port;

Fig. 16 is a view illustrating a modification;

Fig. 17 is a vertical sectional view illustrating a modification by which the eccentrics are adjusted radially as well as angularly;

Fig. 18 is a view showing the parts illustrated in Fig. 17 in detached relation and by which the stroke of the ejection plunger is varied and by which the angular position between the eccentrics is also varied;

Figs. 19, 20 and 21 are horizontal sectional views illustrating that injection starts at the same time and continues through the same number of degrees of angular rotation, or for the same period, regardless of the length of the stroke.

There may be several injector plungers each having a cut-off valve and operating mechanism so that a description of one injector plunger and its cut-off valve and the operating mechanism will be given.

Figure 3:
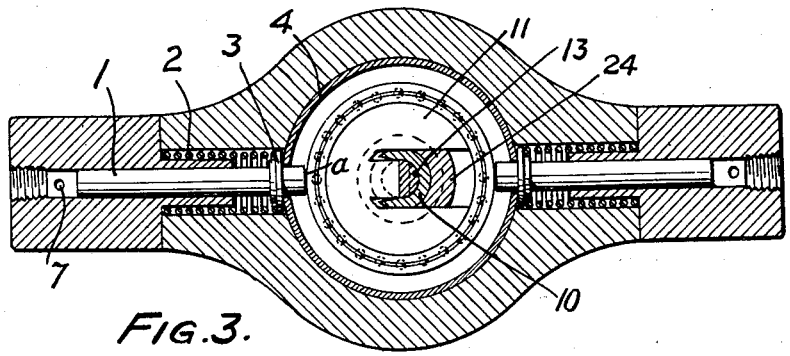
Fig. 3 is a similar view on the line 3—3 of Fig. 1.
Figure 2:
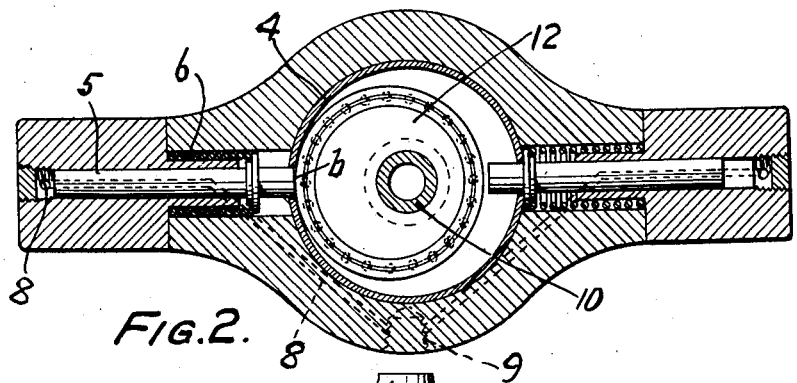
Fig. 2 is a sectional view on the line 2—2 of Fig. 1.
Figure 1:
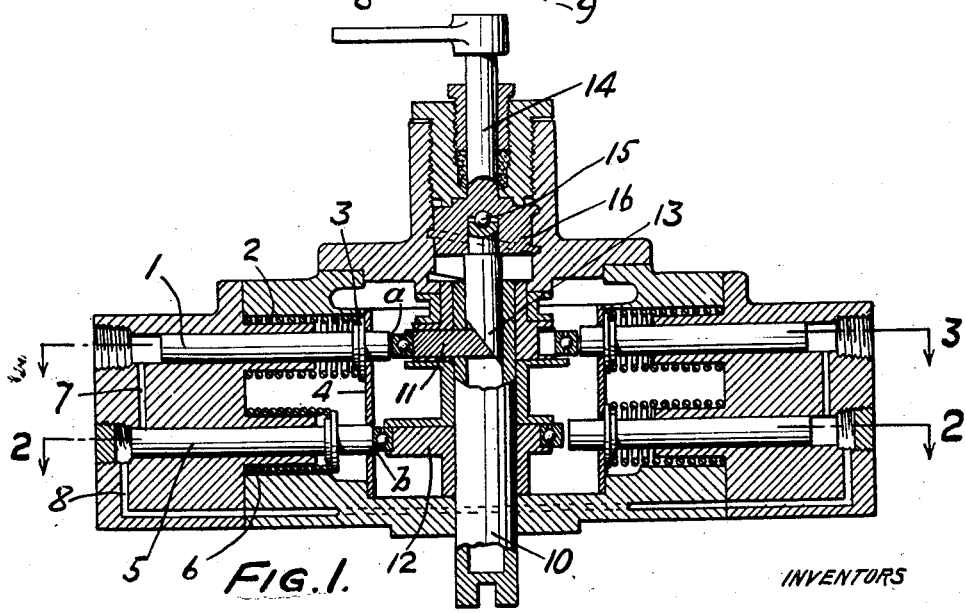

Referring to the drawings, more particularly to Figs. 1 and 3, the injector plunger 1 is spring-pressed by a spring 2 to the position shown in Fig. 3 with its collar 3 in abutment with the portion 4 of the housing. This causes a dwell in the movement of the injector plunger to provide a period in which the cylinder may be properly filled as will be hereinafter more fully described. Referring to Fig. 2, the cut-off plunger or valve 5 is pressed by the spring 6. It is shown in the position in which it closes the fuel inlet duct 7 to the injector plunger, leaving open the fuel intake passage 8 by which fluid fuel, under gravity, is introduced. There is a positively driven tubular shaft 10 and it serves to rotate eccentrics by means of which the injector plunger 1 and the cut-off valve or plunger 5 are operated. The injector plunger is moved by its eccentric in respect to its position of rest when the collar 3 is seated upon the element 4. It may be here stated that as shown one of the ends of the plungers 1 and 5 is flat and presents flat surfaces perpendicular to the axis of the plungers and of appreciable area. These flat ends of the plungers are indicated at *a* and *b* in the drawings. The eccentrics which operate upon the flat ends of the plungers are indicated at 11 and 12 and each is shown to comprise an annular ball-bearing, the outer race of which operates on the plungers, and the inner race of which is connected with the shaft 10 through the intervention of the eccentrics. The eccentric 12, which operates upon the cut-off valve, is eccentrically set on the shaft 10. The radial position of the eccentric 11 is adjustable on the shaft 10 by means of an endwise movable wedge-shaped member 13 arranged in the hollow shaft 10 and adjusted by the handle-piece 14 bearing on its end through the intervention of a ball 15. The wedge-shaped member 13 is moved by a threaded nut 16 formed on the end of handle-piece 14. The eccentric 11 is slotted at *x* as shown in Fig. 3 to straddle the shaft 10 and permit its radial position, with respect to that shaft, to be varied by the wedge-shaped member 13 which moves it in one direction. The springs 2 and the contact with the plungers 1 serve to hold the eccentric up to the wedge-shaped member in its various positions of adjustment.

It may be remarked that, since the eccentrics comprise ball-bearings, the mechanism operates with very little friction and comparatively no noise.

The mode of operation may be described as follows:

Assuming the eccentrics to be rotating counter-clockwise and the eccentric 12 to be set with a lead in respect to the eccentric 11 and referring to Figs. 4, 5 and 6, the injector plunger 1 is held by its spring 2 and collar 3 (Fig. 3) in its inner position and at the end of its suction stroke. The cut-off plunger 5 is in corresponding position and the ports or channels 7 and 8 are open and fluid fuel flows, for example by gravity, to the space ahead of the injection plunger. Continued rotation of the shaft 10, carrying the eccentric 12, causes the cut-off plunger 5 (Fig. 9) to move toward the left and cut off or close the channel 7, and the injection plunger 1 (Fig. 8) thereafter moves toward the left and injects fluid fuel into, for example, the cylinder of a Diesel engine.

Referring to Figs. 10, 11 and 12 and assuming continued rotation of the shaft 10, the ejection plunger 1, having completed its injection stroke, remains substantially at rest and the cut-off plunger is moving toward the right (Fig. 12) to open the inlet port 7 before the plunger 1 starts its return stroke. The then position of the parts is illustrated in Figs. 13, 14 and 15. The injection plunger 1 dwells or stands substantially still as indicated in Figs. 11 and 14 because its end *a* is riding on the outer race of the eccentrically mounted ball-bearing, which outer race does not revolve on its own axis. The result is that, during the inward stroke of the ejection plunger, the fuel channel 7 is kept open so that fuel is delivered, for example by gravity, into the cylinder of ejection plunger and it is kept full of fuel. At that time if fuel, such as gasoline, were drawn, for example by plunger cylinder suction, in small quantity into the space ahead of the ejection plunger on its inward stroke, that fuel would be vaporized and, upon the outward stroke of the plunger, would be liquified, giving rise to a defect known as a vapor lock. The operation is such that fluid fuel reaches the space in advance of the injection plunger, for example by gravity, when the injection plunger is initiating or performing its backward stroke.

It may be remarked that the period of injection is substantially the same no matter what the length of stroke of the ejection plunger 1 may be and no matter what the volume of fuel injected may be. The period of the ejection stroke is fixed by the time required for the high part of the eccentric to advance through a certain number of circular degrees, for example 90, and the length of the ejection stroke is fixed by the radial distance of the high part of the eccentric from the center of revolution. Regardless of the length of the stroke, the end *a* of the plunger rides on the circular face of the eccentric causing a substantial dwell or greatly reduced travel in the movement of the ejection plunger at the end of its out stroke. The end *a* of the ejection plunger, in respect to which different portions of the eccentric may travel permits the plunger to remain substantially at rest or partake of a very slight movement at its outermost position. It may be remarked that the variation in the stroke of the injection plunger is caused by the radial set of its eccentric so that its outer stroke may be made longer or shorter as desired, thus changing the quantity of fluid fuel in front of it, but no matter what that adjustment may be the cut-off plunger closes the fuel intake to the space ahead of the injector plunger only during the completion of the outer stroke of the latter, while during the inward stroke of the ejection plunger the cut-off plunger opens the inlet to the space in front of the ejector plunger thus eliminating the formation of vapor and its subsequent condensation during the stroke of the injection plunger.

The construction and mode of operation of the modification shown in Fig. 16 are as above described except that a cam 12ª is provided with a circular portion which co-operates with the flat end *b* of the cut-off plunger 5 in the manner above described. This is another means of insuring the opening of the inlet to the injection plunger prior to the injection plunger starting on its suction stroke.

When it is desired to change not only the length of the stroke of the ejection plunger 1 but also the period of its occurrence (referring to Figs. 17 and 18), the pin 20 on the wedge-shaped member 13', by engaging a vertical slot 21 in the element 22, and by engaging an inclined slot 23 in the element 24 which is associated with the cam 11, not only serves to permit the wedge-shaped element 13' to shift the cam 11 radially but also to impart to it a motion of rotation. By varying the angle of this slot both in degrees of inclination to the axis of the shaft, or in a forward or backward direction relative to the rotation of the shaft, the time at which the injection starts may be varied proportionately to the length of the stroke if and when desired.

While reference has been made to the flat inner ends of the plungers which are shown in the drawings, it must be understood that, if these plunger ends are somewhat or slightly rounded, the time at which injection starts would be altered minutely but performance would be substantially as described, and even if the plunger ends were quite substantially rounded, performance might in some cases still be satisfactory, and if these ends were made concave, the time of dwell at the end of the stroke would be controlled by the diameter of the concave end. Consequently, the world "flat" as used in this description is inclusive of the structure changes last referred to.

Figure 22:
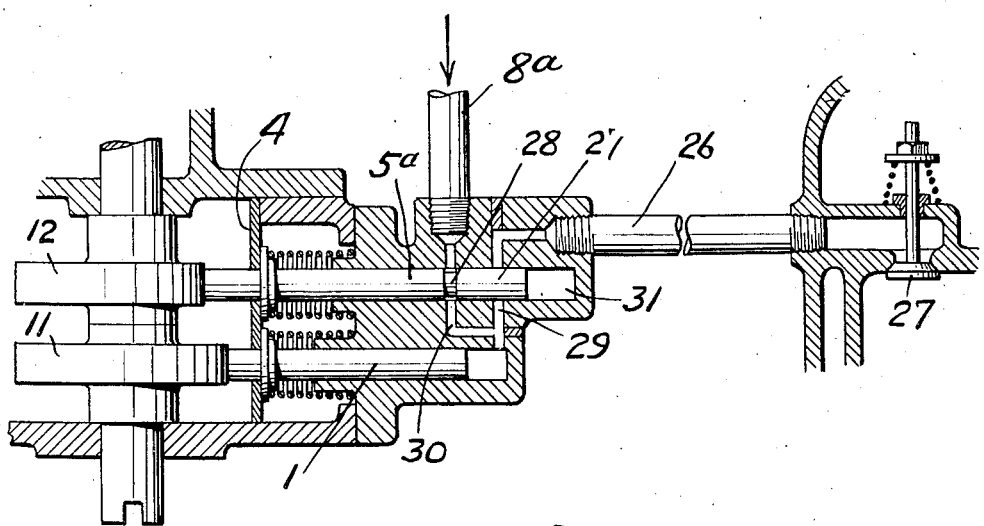
Fig. 22 is an elevational view partly in central section illustrating a modification by which the need for a primer is avoided.

The foregoing description has been given of the described apparatus in operation, it being assumed that a primer had been used where necessary. However, the use of a primer may be eliminated by the provision of the following modification which will be described in connection with Fig. 22. 26 indicates tubing such as used in connection with the described apparatus and, where it is connected with the engine cylinder, there is a check-valve 27, which may require 70 or 80 pounds of pressure to open it. When the previously described injector starts, it injects gasoline into this tube up to a point where air or vapor remaining in the tube is compressed at each stroke to a pressure equalling the pressure of gravity or atmospheric pressure on the fluid fuel entering at 8 (Fig. 1). Upon the return stroke of the injector plunger, the bubble of air or vapor will expand, thereby filling the injection plunger cylinder (Fig. 1) with gasoline from the tube 26 instead of from the tank by the connection 8 and no gasoline will ever be injected past the valve 27 unless a primer is used to clear all of the air or vapor from the tubes 26 at the time of starting.

In the present modification about to be described, the cut-off plunger 5ª is provided with an extension 27 and with a peripheral groove 28. The ejection plunger cylinder is connected by a port 29 to the inlet of the tube 26, and there is a bypass port 30 from the fuel intake 8ª to the port 29. As shown, the extension 27 of the plunger 5ª is guided in a cylinder 31.

When the cut-off plunger 5ª cuts off the intake or bypass 30 to the injection plunger cylinder, it opens the other port 29 leading from the injection plunger cylinder around the groove 28 in the cut-off plunger to the tube 26 which connects with the engine cylinder. Conversely, when the cut-off plunger starts to recede to the point where it opens the intake to the injection plunger as shown in the drawings, it cuts off the port 29, thereby preventing any gasoline in the tube from flowing back into the injection plunger cylinder. Evidently, any gas or vapor forced into the tube by the injection plunger never returns to the ejection cylinder. Each stroke of the injection plunger forces more gas into the tube 26 until the tube is completely full of gasoline, vapor or air having been pushed ahead of the gasoline and past the check-valve 27 and, as a matter of fact, by actual experiment very few strokes of the plunger are sufficient to clear all air out of the tube and injection into the engine cylinder occurred practically immediately.

It will be obvious to those skilled in the art to which the invention relates that modifications may be made in details of construction and arrangement and in matters of mere form without departing from the spirit of the invention.

We claim:

In a fuel injector, an ejection plunger, an eccentric co-operating with said ejection plunger, a hollow rotary shaft on which said eccentric is mounted and by which it is rotated, said eccentric provided with a slot in which the shaft is arranged, a wedge member endwise movable in the hollow shaft and engaging the eccentric to move it radially of the shaft, a co-operating pin and inclined slot between the wedge member and the eccentric by which the eccentric is given a turning movement when the wedge member is moved endwise, and a manually turnable handle having a screw-thread support and arranged for operation on one end of the wedge member to shift it endwise.

FRANK R. WALLACE.
HARRY O. HEDGES.